H. LÜBECK.
APPARATUS FOR EXCHANGE BATTERIES IN ELECTRIC AUTOMOBILES.
APPLICATION FILED JAN. 20, 1919.
1,362,019.
Patented Dec. 14, 1920.
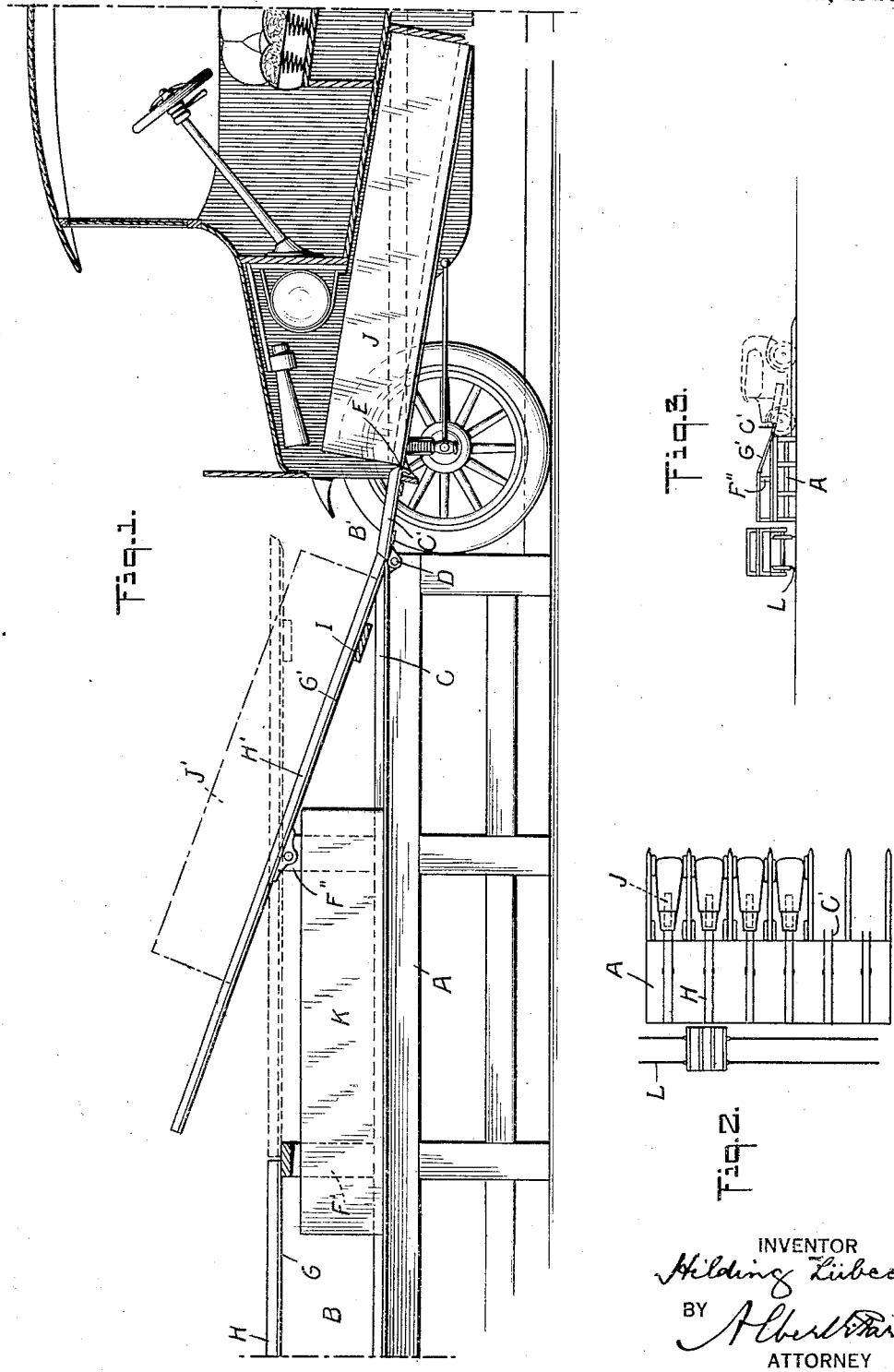
INVENTOR
Hilding Lübeck,
BY
Albert Parker
ATTORNEY

UNITED STATES PATENT OFFICE.

HILDING LÜBECK, OF HERSERUD, SWEDEN.

APPARATUS FOR EXCHANGE-BATTERIES IN ELECTRIC AUTOMOBILES.

1,362,019.  Specification of Letters Patent.  Patented Dec. 14, 1920.

Application filed January 20, 1919. Serial No. 272,176.

*To all whom it may concern:*

Be it known that I, HILDING LÜBECK, a subject of the King of Sweden, residing at Herserud, Sweden, (at present residing at the Biltmore Hotel, Madison avenue and 43rd street, New York city, have invented certain new and useful Improvements in Apparatus for Exchange-Batteries in Electric Automobiles, of which the following is a specification.

This invention relates to apparatus for exchanging batteries in electric automobiles, and its object is to facilitate greatly the operation of removing the used or exhausted batteries and replacing them by new or charged ones. According to my invention a very simple structure is provided, which makes this exchange of batteries a quick and easy operation, and allows the batteries of a large number of cars to be exchanged in a relatively short time.

An example of carrying out my invention has been illustrated in the accompanying drawings, in which—

Figure 1 is a side elevation, with parts in section, of a platform for making the exchange of batteries, this view also showing a portion of an electromobile in position for having its batteries exchanged; and Figs. 2 and 3 are a plan view and a side elevation respectively, showing on a reduced scale, an example of the complete arrangement of the platform and of the means of transportation of the batteries to and from the charging station.

Referring now particularly to Fig. 1, I have shown a platform A carrying a runway B provided with tracks or rail C formed for instance of angle irons, the distance between the individual rails being the same as that between the tracks of the battery compartment of the automobiles. The runway B and the tracks C are extended beyond the edge of the platform, this extension B', C' being pivoted at D, so as to be capable of a tilting movement on the edge of the platform. At its free end this extension is preferably provided with hooks or projections E for a purpose to be stated further on.

The platform A also carries, by means of upright supports F, F', F'', another runway, at a distance above the runway B, this second runway consisting of a stationary portion G and a movable or tilting portion G' fulcrumed on the support F''. In its horizontal position (shown in dotted lines in Fig. 1), the runway portion G' rests with its inner or left-hand end on the support F', while in its normal or inclined position (shown in full lines), its outer or right-hand end rests on the runway B, at a point adjacent to the edge of the platform, or rather to the connection between the runway B and the extension B'. The runway G, G' is suitably provided with tracks H, H' corresponding to the tracks on the lower runway. The swinging or tilting runway G' is so constructed that it will normally assume its inclined position (shown in full lines), in which position, as stated above, its free or outer end will rest on the lower runway. This may be accomplished for instance by making the right-hand portion of the section G' heavier than the left hand portion, as by securing to the underside of said right-hand portion a weight I, or it may be done in any other suitable way, say by making the right-hand portion of the runway G' somewhat longer than the left-hand portion.

The operation of my device is as follows:

An automobile, the batteries of which are to be exchanged, drives up against the platform A; the door or cover closing the battery compartment is then opened and the runway extension B' swung down on its pivot D until the hooks E engage a suitable part (say, for instance notches) on the automobile, so as to prevent the latter from backing away from the platform while the exchange of batteries takes place. The runway section G' being in its inclined position, substantially in line with the runway extension B', as shown, the used or exhausted battery J can now be pulled up first on the runway portion B' and then on the runway section G', as indicated in dotted lines at J'. In its movement up the runway section G' the battery will soon cause this section to tilt back until its left-hand end comes to rest on the support F', the runway section G' being then in alinement with the stationary runway portion G. A new or charged battery K, which rests, or is brought along, on the lower runway B, can then be moved outward on this runway, the outer end of the latter being now entirely clear, and over the extension B' into the battery compartment of the automobile, where it takes the place of the exhausted battery which has just been removed. The runway extension B' may then be swung or folded back, and the exchange operation is completed.

The removal of the exhausted batteries and the putting in place of the new batteries can be done by hand with the assistance of a suitable winch, or it can be done by suitable machinery, and the exchange could in this case take place as a continuous operation, the battery K being set in motion as soon as the runway G' has been swung to its horizontal position.

In order to reduce friction between the battery and the tracks, the latter may be provided with rollers or other means suitable for this purpose.

While I have shown in the drawings an automobile so constructed that its batteries are removed from the front, it is clear that my apparatus can be used just as readily in case the batteries are to be removed from the rear or from the side of the automobile. Likewise, it is applicable where the batteries are placed horizontally, instead of inclined as shown in Fig. 1.

It is also evident that various modifications may be made in the construction and operation of my apparatus without departing from the spirit of my invention. Thus, the stationary portion of the upper runway may extend to the support F'', and the movable portion may simply be pivoted at F'' and extend from such pivot outward, similar to the extension B' on the runway B; or the stationary portion may slant upward from such pivot F''.

The operation of my apparatus could of course be reversed, and the lower runway used for removing the exhausted batteries, and the upper runway for the new batteries. Sometimes it may be desirable to use the two runways alternately, for instance where the batteries are not sent away to a charging station, but are charged right on the platform.

The transportation of the batteries to and from the charging station may be accomplished in various ways. In Figs. 2 and 3 I have shown an example of how this may be done in a practical way in connection with my invention. On the side of the platform opposite to the one on which the automobiles drive up for the exchange operation, is located a track L, on which a truck or carriage, having two floors corresponding to the two runways, and tracks adapted to register with the tracks on the runways, carries the batteries to and from the charging station. This truck may, if desired, be arranged to carry several batteries side by side on each of its floors. For the purpose of facilitating the proper distancing and guiding of the automobiles for the exchange operation, I may provide suitable partitions of wood or concrete secured to the floor on the side where the cars drive up.

I claim as my invention:

1. An apparatus for the exchange of batteries in electric vehicles, comprising a platform, an upper and a lower runway, said upper runway having a stationary and a movable portion, said movable portion being mounted in such a way that it can be brought into contact with the lower runway, or swung out of contact therewith, the two runways, when in contact with one another, meeting at the front of said platform, where the exchange of the batteries takes place.

2. An apparatus for the purpose described, comprising an upper runway and a lower runway, said upper runway having a stationary section and a tilting section movable into and out of registry with the stationary section, said tilting section being mounted in such a way that when swung out of registry with the stationary section it can be brought into contact with the lower runway, and that when swung out of contact with the lower runway it may be brought into registry with said stationary section of the upper runway.

3. An apparatus for the purpose described, comprising an upper runway and a lower runway, each having a stationary and a movable portion, the movable portion of said upper runway being mounted so as to be brought at times into substantial alinement with the movable portion of said lower runway, when the latter is in its operative position.

4. An apparatus for the purpose described, comprising a platform, a runway supported on said platform and having a portion extending beyond said platform and pivotally secured to the main portion of said runway, adjacent to the edge of said platform, another runway, also supported on said platform, but at a distance above said first-named runway, said second-named runway having a movable portion adapted to be swung at times into substantial alinement with the movable portion of said first-named runway.

5. An apparatus for the purpose described, comprising an upper runway and a lower runway, each having a stationary and a movable portion, the movable portion of said upper runway being mounted so as to be brought at times into substantial alinement with the movable portion of said lower runway, when the latter is in its operative position, and hooks at the free end of the movable portion of said lower runway, for engaging and holding securely an electric automobile brought into position in contact therewith.

6. An apparatus for the purpose described, comprising a platform, a lower runway leading to the edge of said platform, and an upper runway having a stationary and a movable section, said movable section being mounted in such a way that it can be brought into contact with said lower runway at the said edge of the platform, or out of contact with said lower runway.

7. An apparatus for the purpose described, comprising a platform, a lower runway leading to the edge of said platform, and an upper runway having a stationary section terminating short of the edge of the platform, and a swinging section fulcrumed intermediate its ends at a point in the rear of the platform edge but in front of the stationary section of the upper runway, said swinging section in one position having its forward end in registry with the edge of the platform and its rear end out of registry with the front end of the stationary section of the upper runway, while in its other position said swinging section has its rear end in registry with the front end of the stationary section of the upper runway and its front end out of registry with the edge of the platform.

8. An apparatus for the purpose described, comprising a platform, a runway carried on said platform, supports on said platform, another runway carried by said supports at a distance from said first-named runway, said second-named runway having a stationary portion and a tilting portion adapted to register at times with said stationary portion, but mounted in such a way that it will normally assume a position in contact with said first-named runway, one of said supports forming a stop for said movable portion when it is tilted from its normal position to a position in registry with said stationary portion.

9. An apparatus for the purpose described, comprising an upper runway having a stationary section, a lower runway extending under and forwardly beyond the said stationary section, and a movable section arranged above the projecting portion of the lower runway, and having its respective ends movable into and out of engagement with said stationary section and said lower runway, the said movable section in one position having its forward end in registry with the lower runway and its rear end out of registry with the front end of the stationary section of the upper runway, while in its other position said movable section has its rear end in registry with the front end of said stationary upper section and its front end out of registry with the lower runway.

In testimony whereof I affix my signature in presence of two witnesses.

HILDING LÜBECK.

Witnesses:
ALBERT E. PARKER,
HELEN LORIA.